March 10, 1936. J. S. ANDERSON 2,033,504

FRUIT BASKET PACKING DEVICE

Filed Aug. 16, 1934

Inventor
John S. Anderson,
By Irving L. McCathran
Attorney

Patented Mar. 10, 1936

2,033,504

UNITED STATES PATENT OFFICE 2,033,504

FRUIT BASKET PACKING DEVICE

John S. Anderson, Ontario, Oreg.

Application August 16, 1934, Serial No. 740,166

2 Claims. (Cl. 226—17)

This invention relates to a fruit basket packing device, and has for its principal object the production of a simple and efficient packing device having a facer plate upon which the fruit may be ring-faced without first placing the facer in the tub.

Another object of this invention is the production of a simple and efficient facer plate which is so constructed as to facilitate the placing of the facer plate upon a rack and also efficiently supporting the facer plate while moving or shoving the fruit up into the basket or container.

A further object of the invention is the production of a simple and efficient tub to be used in conjunction with the facer plate, the tub having hand-holds or openings to facilitate the lifting of the tub after it has been filled with fruit for the purpose of setting the tub or the stand preparatory to receiving the basket or container in which the fruit is to be placed.

With these and other objects in view, this invention consists in certain constructions and arrangements of parts as will be hereinafter more fully described and claimed.

In the drawing:—

Figure 3:
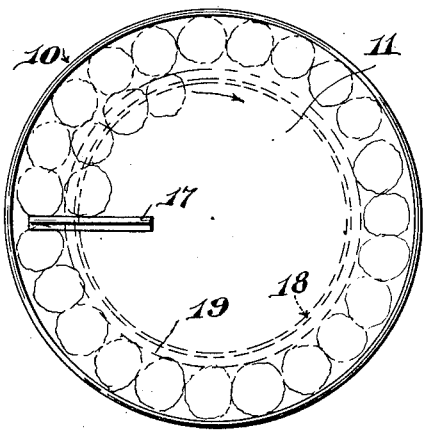
Figure 3 is a top plan view of the facer plate.

By referring to the drawing, it will be seen that 10 designates the facer plate which comprises a dished or concavo-convex bottom 11, which bottom 11 is firmly held within an annular rim 12, the annular rim 12 having intermediate its upper and lower edges an annular inwardly extending bead 13 upon which the edge of the bottom 11 rests and is securely fastened by means of solder or other suitable means. The lower edge of the rim 12 is rolled or beaded, as indicated at 14, in which may be placed a reinforcing wire 15, if desired. The upper edge of the rim 12 is folded inwardly, as indicated at 16, for the purpose of presenting a smooth reinforced upper edge. This structure will present a reinforced rim 12 which will not become warped or distorted and because of this structure the rim 12 may at all times fit for sliding movement within the body 21 hereinafter described. An angular starting strip 17 is soldered or otherwise secured to the upper face of the bottom 11 to one side of the center, as illustrated in Figure 3, for the purpose of providing an abutment against which the fruit may rest when starting to pack the outside row of fruit, thereby greatly facilitating the facing of the fruit. The shape of the bottom 11 will, as will be obvious, give the fruit when packed a rounded or dome-like appearance within the top of the container within which the fruit is to be shipped.

Figure 5:
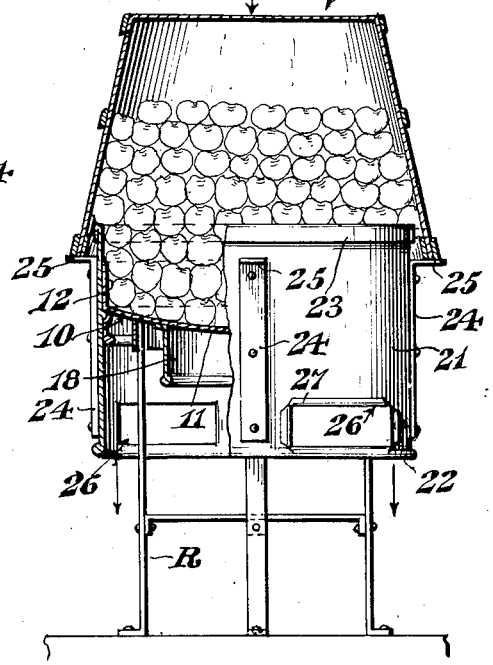
Figure 5 is a side elevation partly in section illustrating the relation of the facer plate, tub and basket or receptacle in the operation of forcing the fruit or similar articles into the basket or container.

Secured to the under face of the bottom 11 is an annular collar 18 of a smaller diameter than the rim 12, the collar extending below the bottom 11, and below the lower edge of the rim 12, as shown in the drawing. This collar 18 is provided with a laterally extending annular flange 19 which is soldered or otherwise secured to the under face of the bottom 11, and the lower edge of this collar 18 is provided with a rolled bead 20 to provide a reinforced lower edge for the collar 18. This collar 18 is made of less diameter than the rim 12 to provide an efficient support for the facer plate 10, and also to provide an efficient anchoring means to fit upon the rack, which rack is the usual type of structure employed and may be of any suitable or desired type without departing from the spirit of the invention. The facer plate 10 is adapted to rest upon the upper end of the rack R, the upper edge of the rack engaging the lower face of the bottom 11 and the collar 18 fitting within the rack R, as illustrated in Figure 5.

In conjunction with the facer plate 10 there is employed a tub consisting of a straight walled body 21 having a rolled beaded lower edge 22 and an outwardly folded upper edge 23. This body 21 is provided also with a plurality of longitudinally extending straps 24 which are secured to the outer face of the body 21, the upper ends of these straps 21 being bent laterally to provide basket-supporting feet 25 which feet are slightly below the upper edge 23 of the body 21. The feet may extend flush with the upper edge if desired.

Figure 1:
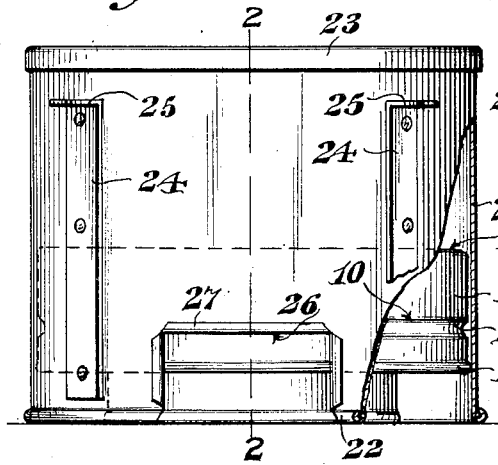
Figure 1 is a side elevation of the improved tub and facer plate, the tub being shown partly in section.
Figure 4:
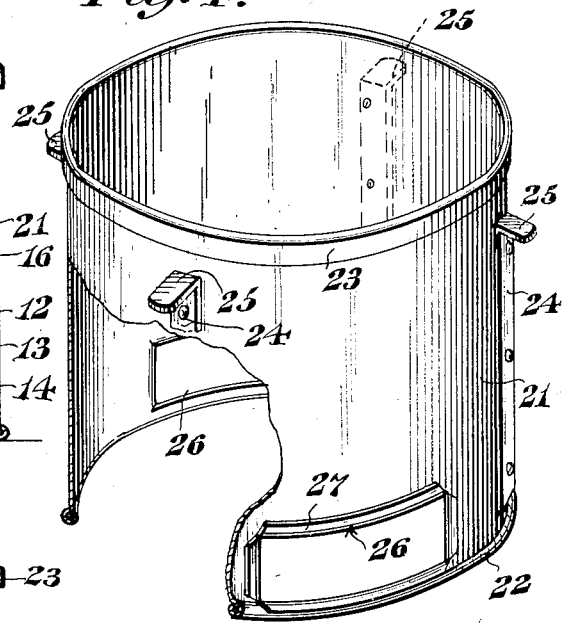
Figure 4 is a perspective view of the tub a certain portion being shown in section.
Figure 2:
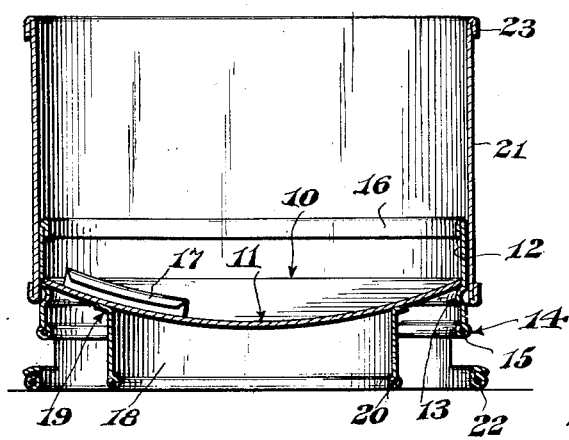
Figure 2 is a section taken on line 2—2 of Figure 1.

The body 21 is provided near its lower edge with a pair of diametrically arranged hand-holds or apertures 26, the edges of which are folded over to provide protector flanges 27, as shown in Figure 4. It will be obvious also that these hand-holds or apertures 26 will permit the operator to extend his fingers under the rim 12 and bottom 11 for adjusting the bottom or supporting the rim 12 and bottom 11 while placing the packing device upon the rack R.

The operation of the device is as follows:—

The facer plate 10 is removed from the tub 21 and the fruit to be faced is placed upon the upper face of the bottom 11 of the facer plate 10 in a manner, as shown in Figure 3, starting by placing the fruit against the starter strip 17 beginning with the outside row of the fruit and working toward the center. After the fruit has been faced, the tub body 21 may be placed over the facer plate, the facer plate being so constructed as to slide snugly within the straight-walled body 21, as will be obvious by considering the drawing The fruit is then placed within the tub in the usual manner, adhering snugly against the inner face of the straight walled tub, the weight of the fruit providing a sufficient binding action to hold the parts in proper relation. When the tub has been fully packed, the operator by placing his hands through the hand-holds 26 may lift the tub and facer plate and place the device upon the rack R, in the manner shown in Figure 5, the basket or other suitable container B being rested or placed upon the supporting feet 25 and by forcing the basket B downwardly in the direction shown by the arrangement in Figure 5, the tub 21 will be moved downwardly and since the facer plate 10 rests upon the upper edge of the rack R, the fruit will be forced up into the basket B and after the fruit has been properly forced into the basket or container B, the device may be turned upright and a suitable cover placed over the upper end of the container B, as is usual. Due to the fact that the feet 25 are slightly below the upper edge of the body 21, the upper edge of the body will assist in anchoring the receptacle B.

It should be understood that certain detail changes in the mechanical construction, combination and arrangement of parts may be employed without departing from the spirit of the invention, so long as such changes fall within the scope of the appended claims.

Having described the invention, what is claimed as new is:—

1. A fruit basket filling device comprising a straight-walled cylindrical body constituting a tub, the walls being of uniform diameter throughout their entire length, a removable facer plate constituting an annular rim having intermediate its ends an annular inwardly extending bead, a bottom plate having its edges resting upon said bead, the upper edge of said annular rim being folded inwardly to provide a reinforcing edge, the lower edge of said rim being beaded whereby the rim will be reinforced and held against distortion or warping to insure free sliding of the rim within the body, and said bottom having means for facilitating the holding of the bottom upon a supporting rack.

2. A fruit basket filling device comprising a body constituting a tub, a sliding facer plate mounted for sliding movement within the tub, said tub having enlarged hand-holds constituting apertures formed in the side walls of the tub near the bottom thereof to facilitate the handling of the tub and also to permit the extension of the fingers of the operator through the hand-holds to support said facer plate within the tub while placing the tub upon a supporting rack.

JOHN S. ANDERSON.